(12) United States Patent
Miller et al.

(10) Patent No.: US 7,597,254 B2
(45) Date of Patent: Oct. 6, 2009

(54) SCALE WITH AUTOMATIC IDENTIFICATION OF SPECIALS AND OTHER PRICE AND PRODUCT CHANGES

(75) Inventors: David S. Miller, Troy, OH (US); Santos Juan-Castellanos, Springfield, OH (US); Lawrence A. Pevoar, Miamisburg, OH (US)

(73) Assignee: Premark FEG L.L.C., Wilmington, DE (US)

( * ) Notice: Subject to any disclaimer, the term of this patent is extended or adjusted under 35 U.S.C. 154(b) by 391 days.

(21) Appl. No.: 10/922,495

(22) Filed: Aug. 20, 2004

(65) Prior Publication Data

US 2006/0038008 A1 Feb. 23, 2006

(51) Int. Cl.
*G06K 15/00* (2006.01)
(52) U.S. Cl. .................. 235/383; 235/378; 235/385
(58) Field of Classification Search ................. 235/383, 235/385, 376, 378; 177/4, 5, 25.15; 705/20; 902/22
See application file for complete search history.

(56) References Cited

U.S. PATENT DOCUMENTS

| | | | | |
|---|---|---|---|---|
| 4,055,753 A | * | 10/1977 | Rogers et al. ............... 705/415 |
| 4,423,486 A | * | 12/1983 | Berner ........................ 705/416 |
| 4,700,791 A | * | 10/1987 | Iwasaki et al. .................. 177/2 |
| 4,724,306 A | * | 2/1988 | Kitaoka et al. ............... 235/385 |
| 4,879,650 A | * | 11/1989 | Kurimoto et al. ............. 705/21 |
| 4,936,693 A | * | 6/1990 | Ohsawa ....................... 400/104 |
| 5,052,504 A | * | 10/1991 | Ikeda et al. .................... 705/21 |
| 5,578,797 A | * | 11/1996 | Hewitt et al. ................... 177/5 |
| 5,987,428 A | * | 11/1999 | Walter .......................... 705/23 |
| 6,269,342 B1 | * | 7/2001 | Brick et al. .................... 705/20 |
| 6,530,521 B1 | * | 3/2003 | Henry .......................... 235/383 |
| 6,982,388 B2 | * | 1/2006 | Kasinoff ......................... 177/2 |
| 7,026,556 B1 | * | 4/2006 | Schuller ................... 177/25.15 |
| 7,051,944 B2 | * | 5/2006 | Weisz et al. .................. 235/488 |
| 7,070,097 B2 | * | 7/2006 | Blanford et al. ............. 235/383 |
| 7,099,038 B2 | * | 8/2006 | Schuller .................... 358/1.18 |
| 2003/0037965 A1 | * | 2/2003 | Bennard ......................... 177/4 |
| 2003/0205412 A1 | * | 11/2003 | Hewitt et al. ............. 177/25.15 |
| 2004/0003947 A1 | * | 1/2004 | Kesselman et al. ........ 177/25.13 |
| 2004/0211600 A1 | * | 10/2004 | Schuller et al. ........... 177/25.15 |

* cited by examiner

*Primary Examiner*—Seung H Lee
(74) *Attorney, Agent, or Firm*—Thompson Hine LLP

(57) ABSTRACT

A scale is configured to automatically identify changes to product information and may communicate certain information to customers based upon such changes.

7 Claims, 4 Drawing Sheets

| PLU # | PRICE / LB | SPECIAL PRICE / LB | PRODUCT NAME | PRODUCT IMAGE DATA | LABEL DATA 1 | LABEL DATA 2 |
|---|---|---|---|---|---|---|

*Fig. 4*

| PLU # | PRICE / LB | SPECIAL PRICE / LB | PRODUCT NAME | PRODUCT IMAGE DATA | LABEL DATA 1 | LABEL DATA 2 | ALERT |
|---|---|---|---|---|---|---|---|

*Fig. 7*

SCALE WITH AUTOMATIC IDENTIFICATION OF SPECIALS AND OTHER PRICE AND PRODUCT CHANGES

TECHNICAL FIELD

The present application relates generally to scales used to weigh perishable food products in supermarkets, and more particularly to a scale that automatically identifies specials, new items and other price and product information based upon product and pricing data communicated to the scale.

BACKGROUND

Scales have been used in stores such as supermarkets and groceries to weigh and price food items and to generate a pricing label for such food items. Stores commonly change prices, add new food items to their offerings or remove food items from their offerings. It would be advantageous to provide a simple technique for communicating some of this information to customers.

SUMMARY

In one aspect, in a perishables department of a store, a self-service scale for weighing food products and printing labels includes a weighing station for receiving food products to be weighed, a user interface including a display screen for communicating information to users, and a controller operatively connected with the weighing station to receive weight indication and operatively connected with the display screen for controlling information displayed thereon. The controller has access to memory storing existing product information for multiple products available in the store. When updated product information is provided to the memory the controller automatically compares the updated product information to the existing product information to identify whether the updated product information includes a certain change.

In another aspect, a scale for weighing food products includes a weighing station for receiving food products to be weighed, a user interface including a display screen for communicating information to users and a controller operatively connected with the weighing station to receive weight indication and operatively connected with the display screen for controlling information displayed thereon. The controller has memory storing existing product information, including price, for products to be weighed by the scale. The controller includes a communication input for electronically receiving updated product information. When the controller receives updated product information the controller automatically compares the updated product information to the existing product information to identify whether the updated product information includes a change.

In a further aspect, a method for marketing special price information to consumers in a store using a scale is provided where the scale includes a display for displaying information to consumers and a controller with access to memory storing existing product information, including price information, for products to be weighed by the scale. The method includes the steps of receiving at the memory updated product information; the scale controller compares the updated product information with the existing product information to identify whether the updated product information includes a price reduction for a product and, if so, the scale controller automatically effects display of a special price alert on the display to communicate the price reduction to consumers.

In still another aspect, a scale for weighing food products includes a weighing station for receiving food products to be weighed, a user interface including a display screen for communicating information to users and a controller operatively connected with the weighing station to receive weight indication and operatively connected with the display screen for controlling information displayed thereon. The controller has memory storing product information records for products to be weighed by the scale, the product information records including multiple fields including at least a price field and an alert field. In connection with each product record for which the alert field contains a special price indicator, the controller operates to display a special price alert for the product associated with each such product record.

BRIEF DESCRIPTION OF THE DRAWINGS

FIG. 4 is an exemplary product information record;

FIG. 7 is another exemplary product information record.

DETAILED DESCRIPTION

Figure 1:
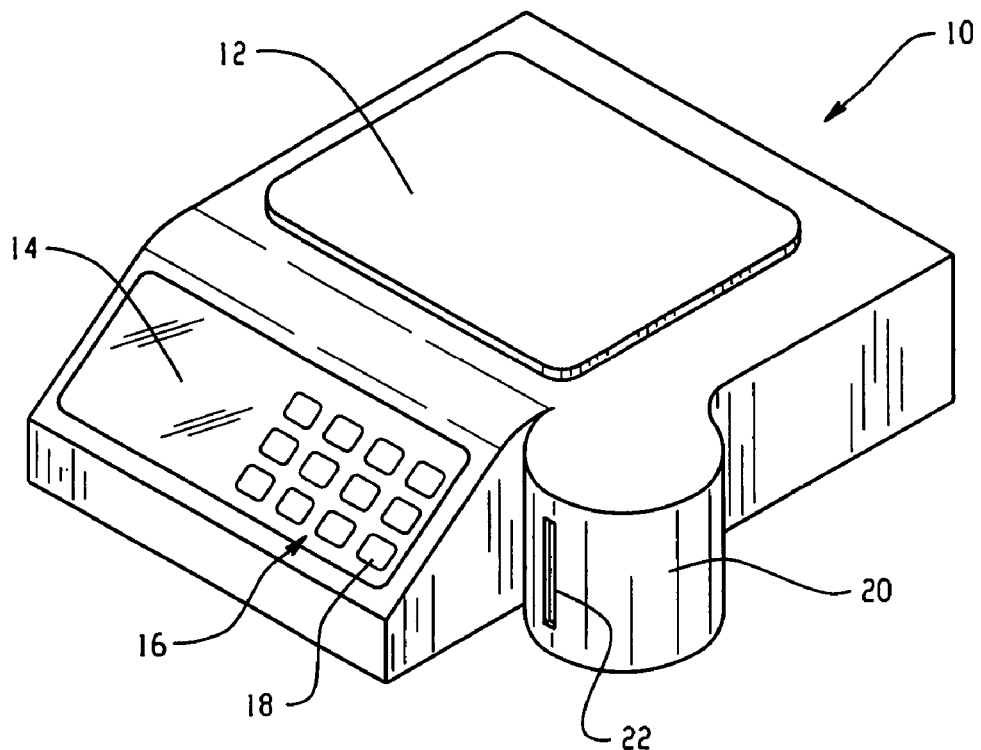
FIG. 1 is a perspective view of an exemplary food product scale.

Referring to FIG. 1 an exemplary scale 10 is shown including a weigh station 12 and a display screen 14. Weigh station 12 may take the form of a platter-type member supported in relationship to a load cell (internal of the scale housing) that produces a weight indicative signal when a food item is placed on the weigh station 12 for weighing. Illustrated display screen 14 may take the form of an LCD-type display, but other technologies could be used. In the illustrated embodiment the display 14 is a touch screen-type display that also functions as a user input device 16 by displaying buttons/icons 18 that can be triggered by a user. A separate user input device could also be provided, for example, in the form of manually activated keys/buttons located alongside the display 14. A side portion 20 of the scale housing holds a label printer and associated supply of labels, which are dispensed through a label slot 22 in the housing. Although display screen 14 is shown incorporated into the housing of the scale 10, the display could take the form of a marquee-type display located on a support extending upward from the scale housing.

Figure 2:
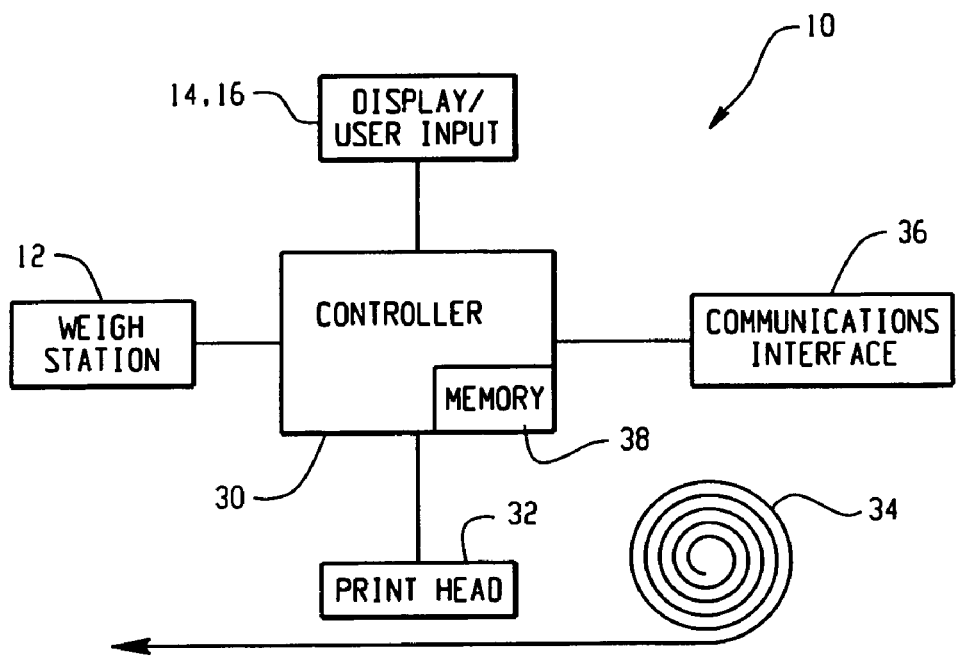
FIG. 2 is a schematic of the scale of FIG. 1.
Figure 3:
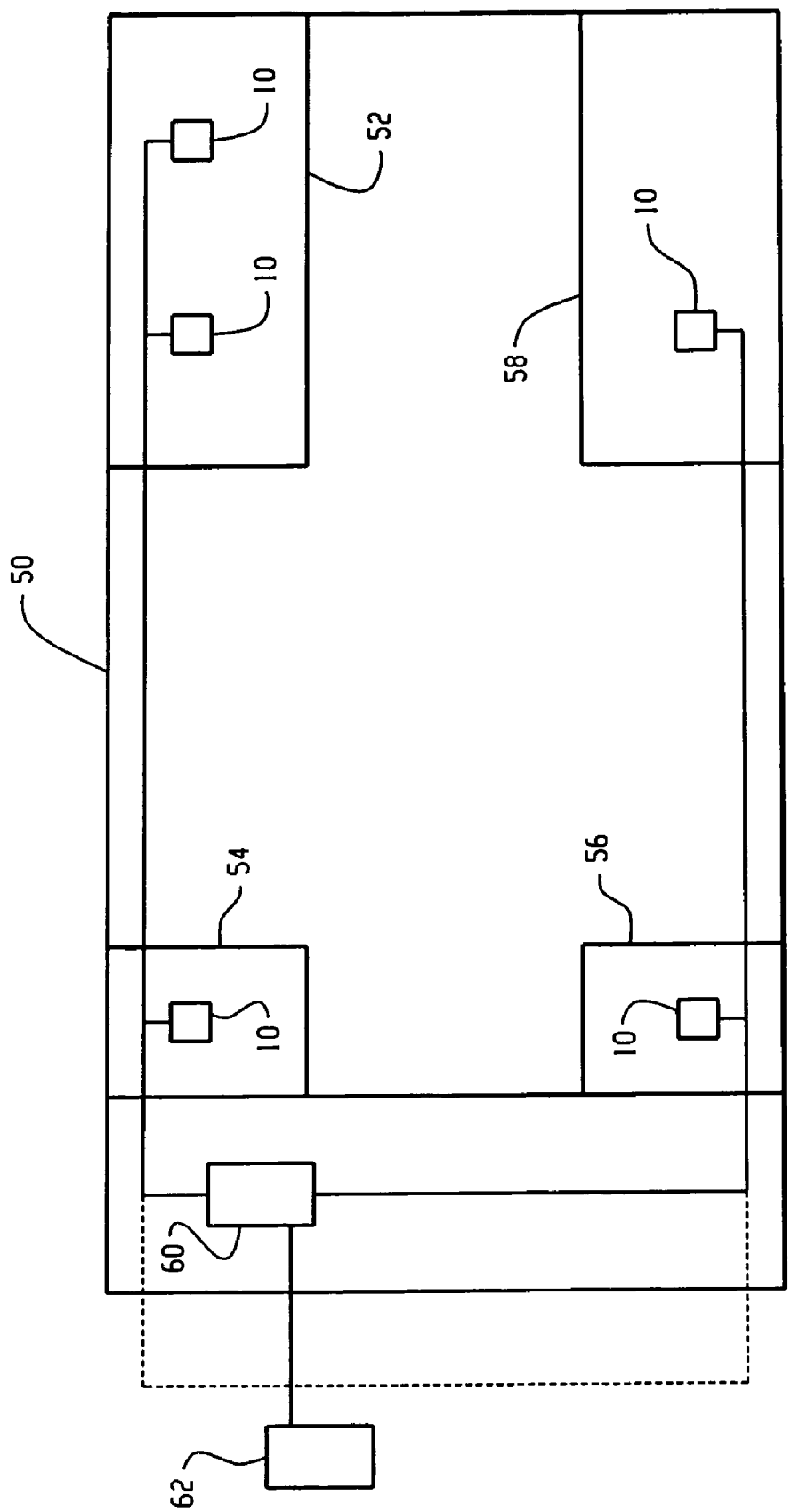
FIG. 3 is a plan layout of an exemplary store.

Referring now to FIG. 2, an exemplary schematic of the scale 10 is shown. The scale includes a controller 30, such as a microprocessor based unit, connected to control the display 14 and user input 16 and connected to receive weight indicative signals from the weighing station 12. A print head 32 and associated supply of label stock 34 that can be moved past the print head 32 is also shown. In one example the print head 32 may be a thermal print head for use with thermally activated label stock. However, other types of printing technologies and label media could also be used. The controller 30 is also connected with a communications interface 36, which may take the form of a standard connector (and associated circuitry) for a USB, RS-232, Ethernet or other hard-wired communication line. In another example the communications interface 36 may be formed by a wireless communication device such as an RF transceiver. The illustrated controller 30 includes associated memory 38 for storing product information.

When a user places a food item on the weighing station 12, the food item is identified to the controller via the user input device 16. For example, the user may input a product lookup (PLU) number assigned to the product. In another example, the display 14 may generate a list of food products or a series of pictures of food products from which the user can select. In still another example, the scale 10 may include technology, such as vision technology or RFID technology, enabling the scale to identify the food product merely from its placement on the weighing station. After the food product is identified to the controller 30, the controller 30 then retrieves from memory 38 price information for the identified food product and calculates a price for the item based upon its weight. Additionally, some food items may be priced according to count, in which case the user also identifies to the controller 30 the count so that the controller can calculate price from the count. Once price is calculated, the controller effects printing of a pricing label for the weighed product so that the pricing label can be applied to the product. Such label printing may be automated or may be triggered through the user input 16. Notably, information in addition to price may also be retrieved from memory 38 for the purpose of defining the label that is printed.

In one example, a store 50 may include a fruit and vegetable department 52 with multiple scales 10, in the form of self-service scales, located therein for use by customers in weighing items they select. Similarly, a fish department 54, meat department 56 and deli department 58 may include respective scales 10, which typically are not self-service, as they are controlled by store personnel. A store computer 60 may be connected for communication with the scales 10 to provide them with up-to-date product information. A remote computer 62 may also be connected, either through the store computer 60 or directly, to the scales 10. Typically, when price or product changes are made for a particular department of the store 50, updated product information is uploaded to the scales 10 affected by such changes. Advantageously, in the case of such an upload, and prior to discarding the existing product information in memory 38, the controllers 30 in the scales 10 contemplated herein compare the updated product information with the existing product information in order to identify whether the updated product information includes a certain change or certain changes. The controllers 30 of the scales 10 can then take certain actions, including alerting customers to changes in which the customers might be particularly interested.

For the sake of exemplary discussion, consider self-service scales 10 in the fruit and vegetable department 52 of store 50. Assume the memory in scale 10 in the fruit and vegetable department 52 stores existing product information for products in the department 52. When the store desires to make a change, the store computer 60, or remote computer 62, delivers updated product information to the scale for replacing the existing product information stored in the scale memory 38. When the updated product information is received by the scale 10, the scale controller 30 checks to determine whether certain changes have been made.

Figure 6:
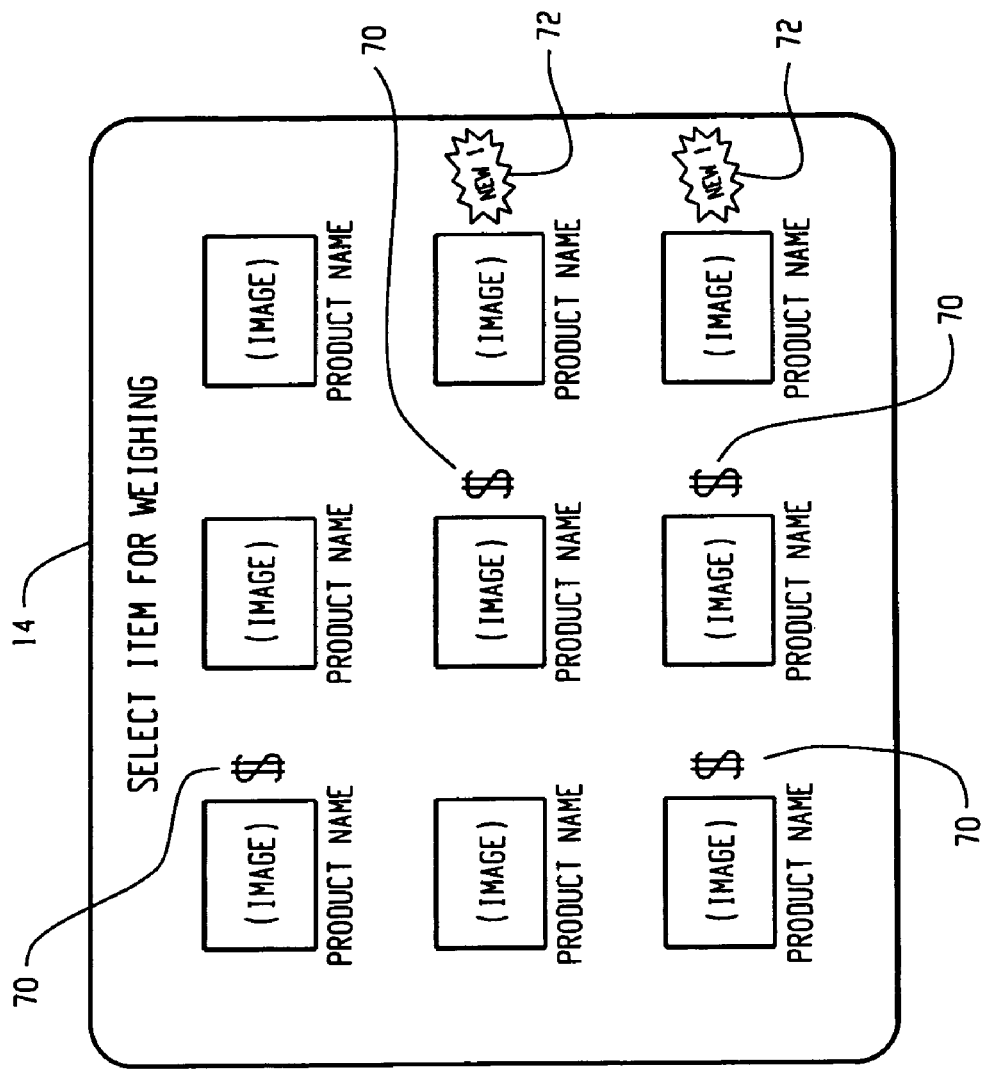
FIG. 6 is an exemplary scale display screen.
Figure 5:
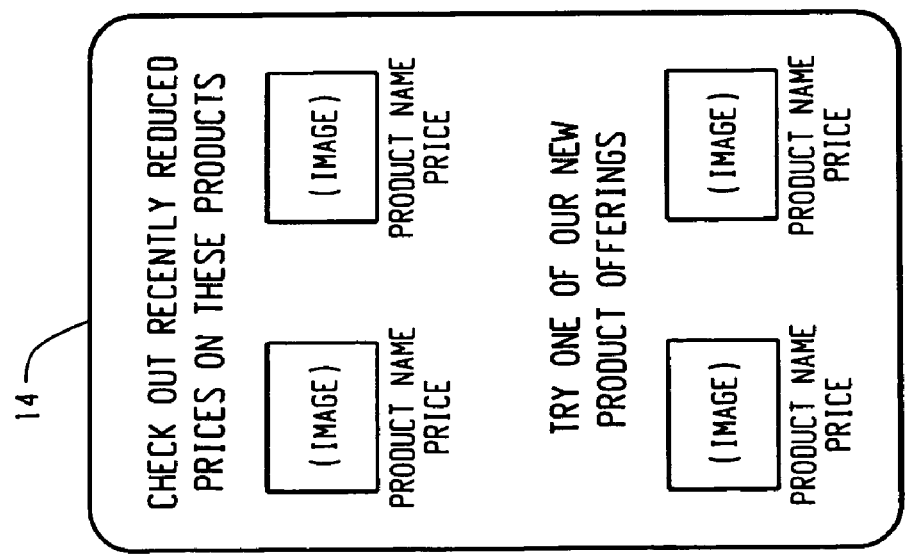
FIG. 5 is an exemplary scale display screen.

For example, assuming the product information associated with each product is stored in association with a record according to PLU number for the product, with a simple exemplary record for a product shown in FIG. 4 where the record includes the PLU #, a standard price per pound, a special price per pound, product name, product image data, label data 1 and label data 2. For each PLU # present in both the existing product information and the updated product information, the controller determines whether a price change has been made and, if so, whether the price change is a price increase or a price decrease. If a product has an associated price decrease, the scale controller may cause a special price alert for that product to be displayed on the scale display 14. In one example, in a normal wait or standby state the controller may effect the display of a screen such as that shown in FIG. 5, advising customers of products having recently reduced prices, and placement of the product on that display represents the special price alert. In another example, during a normal wait or standby state of the scale a screen may simply display the most commonly weighed items and for each item having a recently reduced price, a special price icon 70 may be displayed alongside that item, in which case the special price icon 70 represents the special price alert. The controller 30 may be configured to automatically remove items from the display of FIG. 5 or to automatically remove the pricing icon 70 from the display represented by FIG. 6 a specified time period (e.g., 3 days) after the price has been reduced. If a product has an associated price increase, the scale controller eliminates any special price alert that may have been previously associated with that product. In the case of the foregoing, the price changes could be reflected in either one or both of the standard price per pound or the special price per pound, where the special price per pound may be a price assigned to frequent shopper customers. It is also recognized that products having associated by counts (e.g., where a product is priced as 3 for $1) can be identified as having price change when the by count changes.

In addition to checking for price changes, the scale controller 30 may also compare the updated product information with the existing product information to identify the removal of a product or the addition of a new product. In the case of newly added products, in one example the controller may effect display of a message advising customers of new products as reflected in the lower half of the representative display of FIG. 5. In another example the controller may effect the display of an icon 72 indicating new products as reflected in the representative display of FIG. 6. In the case of products that have been removed, meaning they are not being offered by the store anymore, the scale controller 30 automatically eliminates the display of any information concerning such removed products.

In another example the product information stored in memory of the scale may include coupons available to be printed by the scale. For example, when a particular product is weighed the scale may automatically print a coupon for another product. The scale controller 30 compares the updated product information against the existing product information to identify any products that previously had no associated coupon but will have an associated coupon printed going forward, in which case the controller 30 may effect display of a message communicating the products having newly available coupon(s), and/or the coupon(s) themselves, to customers.

It is to be clearly understood that the above description is intended by way of illustration and example only and is not intended to be taken by way of limitation. For example, while the illustrated example assumes all necessary product information is stored directly in memory of each scale, it is recognized that distributed scale systems exist in which a primary or master scale stores the product information and other, secondary scales in the store are connected to the master scale to retrieve product information from that scale. In such cases, the master scale might be configured to perform the above-mentioned comparisons and to subsequently direct the secondary scales to display price alerts and new product alerts etc. Further, it is possible that the store computer 60 or remote computer could simply instruct (by way of the updated product information data records communicated to a scale) the scale to display a special price alert or new item alert so that the scale controller does not need to perform a comparison of the updated product information with the existing product information. In such a case, the product records for each product may include a field for designating an alert, and that field may be set prior to the store computer or remote computer sending the updated product information to the scale. For example, the product records may include an 'alert' field, as per FIG. 7. If the alert field of a product record is set to '0', the scale does not communicate any special alert to customers. If the alert field of the product record is set to 1 (where 1 acts as a special price indicator), the scale may communicate a special price alert to customers. If the alert field of the product record is set to 2 (where 2 acts as a new item indicator), the scale may communicate a new item alert to customers. Additionally, while the illustrated scale embodiment includes single display, it is contemplated that scales with more than one display could incorporate various of the features described herein. For example, a scale in a deli department might have an operator display and a consumer display, in which case special price alerts and other information could be communicated to customers via the customer display. Other changes and modifications could be made.

What is claimed is:

1. A scale for weighing food products, comprising:
a weighing station for receiving food products to be weighed;
a user interface including a display screen for communicating information to users, the display screen is a touch-screen type display;
a controller operatively connected with the weighing station to receive weight indication and operatively connected with the display screen for controlling information displayed thereon, the controller having memory storing existing product information, including multiple existing product records for corresponding products to be weighed by the scale, each existing product record including at least a product number and a product price, the controller including a communication input for electronically receiving updated product information in the form of updated product records, the controller operates to display a product selection interface with selection areas for multiple products, when the controller receives updated product information, and prior to discarding the existing product information, the controller automatically compares updated product records of the updated product information to existing product records of the existing product information to identify whether a product price in an updated product record for a given product is less than a product price in an existing product record for the given product and, if so, the controller automatically adjusts display information of the product selection interface to effect display of a price reduction alert indicator for the given product on the product selection interface prior to any weighing operation of the given product.

2. The scale of claim 1 wherein the price reduction alert indicator is a special price alert icon adjacent a display of an image and/or a name of the given product.

3. The scale of claim 2 wherein the controller operates to eliminate display of the special price alert icon associated with the given product after a set period of time.

4. The scale of claim 1 wherein the controller automatically compares updated product records of the updated product information to existing product records of the existing product information to identify whether a product price in an updated product record for a certain product is more than a product price in an existing product record for the certain product and, if so, the controller operates to eliminate display of any price alert indicator previously displayed on the product selection interface for the certain product, where the certain product is different than the given product.

5. The scale of claim 4 wherein the controller automatically compares updated product records of the updated product information to existing product records of the existing product information to identify whether a coupon present in an updated product record for a third product is not present in an existing product record for the third product and, if so, the controller automatically generates display information for the product selection interface to alert users to availability of the coupon in association with the third product prior to any weighing operation for the third product.

6. In a perishables department of a store, a self-service scale for weighing food products and printing labels, comprising:
a weighing station for receiving food products to be weighed;
a user interface including a display screen for communicating information to users;
a controller operatively connected with the weighing station to receive weight indication and operatively connected with the display screen for controlling information displayed thereon, the controller having access to memory storing existing product information in the form of existing product records for multiple products available in the store, when updated product information in the form of updated product records is provided to the memory, and prior to discarding the existing product information, the controller automatically compares updated product records of the updated product information to existing product records of the existing product information to identify whether an updated product record exists for a given product where no existing product record was provided for the given product and, if so, the controller operates to effect display of a new product alert icon on the product selection interface.

7. A method for marketing special price information to consumers in a store using a scale including a display for displaying information to consumers the scale including a controller with access to memory storing existing product information, including multiple existing product records for multiple corresponding products to be weighed by the scale, each existing product record including a product identification and a product price, the method comprising:
the scale controller effecting display of a product selection interface for use by scale users in identifying products to be weighed;
receiving at the memory updated product information including multiple updated product records, each updated product record including a product identification and a product price;
while both the existing product information and the updated product information are within memory, the scale controller automatically compares updated product records and existing product records having the same product identification to identify whether the updated product records include a price reduction for a product of the product selection interface and, if so, the scale controller automatically effects display of a special price alert indicator on the product selection interface to communicate to consumers that the product has special price, the special price indicator being other than price itself.

* * * * *